Sept. 17, 1957 K. O. ANDERSEN 2,806,336
HARROW TOOTH
Filed March 15, 1954 2 Sheets-Sheet 1
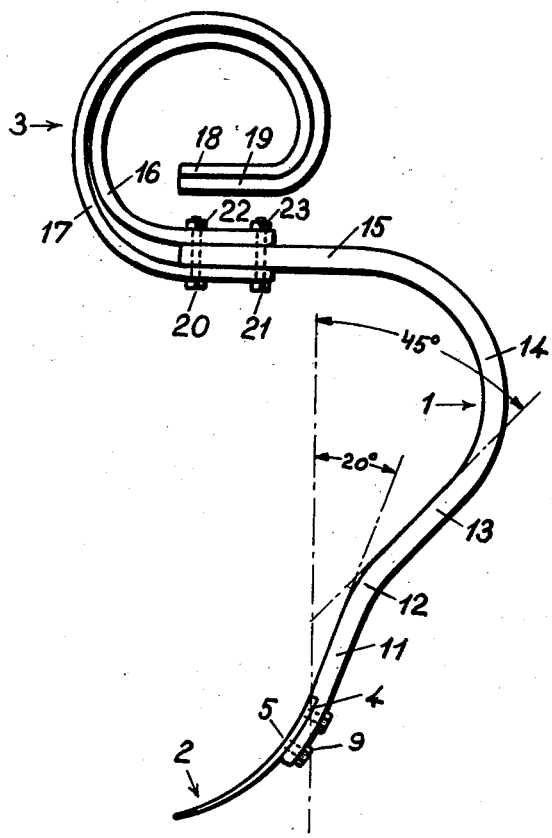
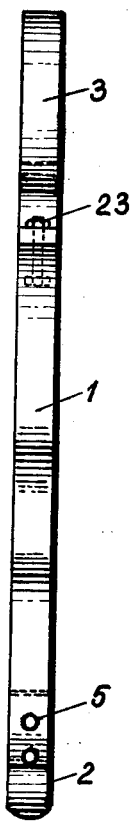
INVENTOR
KAJ OTTO ANDERSEN
BY
ATTORNEYS Sept. 17, 1957  K. O. ANDERSEN  2,806,336
HARROW TOOLTH
Filed March 15, 1954  2 Sheets-Sheet 2
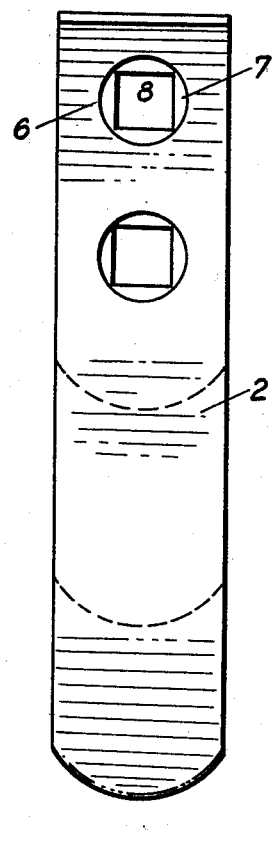
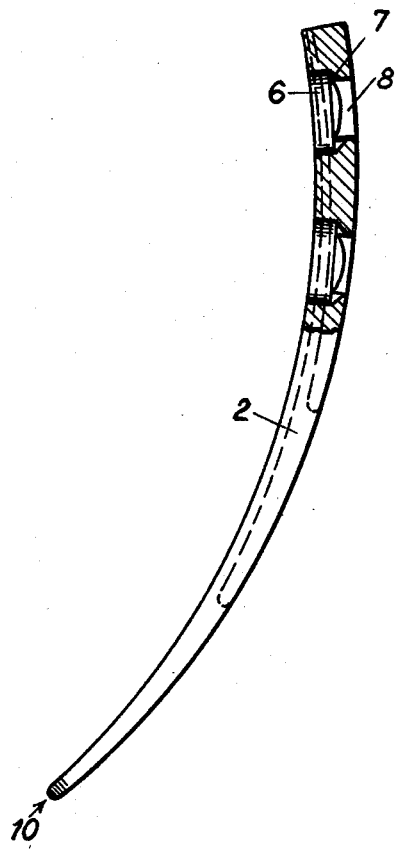
INVENTOR
KAJ OTTO ANDERSEN
BY
ATTORNEYS United States Patent Office 2,806,336
Patented Sept. 17, 1957

2,806,336

HARROW TOOTH

Kaj Otto Andersen, Nyvang by Skelskor, Denmark

Application March 15, 1954, Serial No. 416,356

Claims priority, application Denmark March 20, 1953

4 Claims. (Cl. 55—97)

This invention relates to a harrow tooth adapted to be attached to a harrow frame at its upper end and to stand forwardly and downwardly aslant at its lower, soil engaging end.

In the operation of harrows having teeth of this type as heretofore known, the difficulty is frequently encountered that roots, weeds, grass and other debris dug up from the soil will tend to clog the teeth.

It is an object of the invention to eliminate or substantially reduce such clogging.

With this object in view, according to one feature of the invention, there is provided a harrow tooth comprising a soil engaging lower portion constructed to dig up earth, stubble, roots, weeds, and other debris from the soil, an intermediate portion bent rearwardly through a rounded bend relative to said lower portion and extending at an inclination and having a length such as to form a travel path on which earth, weeds, roots and other debris liberated from the soil will be caused to slide up and down by the action of new material pushing up from below at varying speed, and an upper portion constructed for attachment to the frame of a harrow.

It is another object of the invention to construct a harrow tooth of the type set forth in which the shape of the front portion of the tip will remain substantially unchanged though the tip may be worn down to a considerable extent.

It is a further object of the invention to improve the spring attachment of a harrow tooth so as to eliminate uncontrolled and undesirable vibrations.

Other objects, advantages and features of the invention will appear from the following detailed description of one embodiment thereof, reference being had to the accompanying drawings in which Fig. 1 is a side view of one form of a harrow tooth according to the invention, Fig. 2 is a rear view of same, Fig. 3 is a front view of a detachable tip of the harrow tooth, on an enlarged scale, and Fig. 4 is a side view, partly in section, of the tip illustrated in Fig. 3.

The harrow tooth shown in the drawing is composed of a shank 1, a detachable tip 2 at the lower end of the shank, and a spring attachment 3 at the upper end of the shank.

The tip is mounted in a recessed seat 4 at the lower end of the shank in such a manner that its front surface is flush with that of the shank. The tip is attached to the shank by means of two bolts 5 having cylindrical heads bevelled at their rear end and followed by square stems, to fit in similar holes of the tip comprising a cylindrical portion 6, a conical portion 7, and a square portion 8. At their rearward ends extending through holes of the shank the stems of the bolts are threaded to receive clamping nuts 9. The described arrangement for attaching the tip to the shank has the advantage that the front surface of the tooth will be entirely smooth with no obstacles protruding into the path of material pushing up along the front surface of the tooth.

The lower portion 11 of the shank to which the tip is attached is inclined at a relatively steep angle, e. g. as shown in the drawing at an angle of about 20° with a vertical plane. At some distance above the point of attachment of the tip, the shank is bent rearward through a rounded bend 12 to form a travel portion 13 that extends rearwardly and upwardly at a greater angle with a vertical plane than the portion 11, e. g., as indicated in the drawing, at an angle of about 45°. The intermediate or travel portion 13 of the shank is continued through a large forward bend 14 into a horizontal, forwardly extending shank portion 15 which is clamped between two spiral spring straps 16 and 17 forming the spring attachment 3 of the harrow tooth, the said straps being terminated by horizontally projecting strap portions 18 and 19 respectively adapted to be attached to the frame of a harrow. The clamping of the shank portion 15 between the spring straps 16 and 17 is effected by means of two bolts 20 and 21 extending through holes of the spring straps and the shank portion 15 and provided with clamping nuts 22 and 23.

When the harrow tooth is in operation, earth, roots, stubble, weeds, grass and other debris dug up from the soil by the action of the tip will push up along the front surface of the latter and the shank. Now, in harrow teeth as ordinarily constructed there is a great danger that this material may clog the teeth and grow into large accumulations that are pushed along the surface of the soil ahead of the teeth thereby seriously interfering with the operation of the latter.

To obviate this drawback it has been proposed to construct the shank of a harrow tooth with a rearward kink intended to subject the accumulations to a sudden shock for the purpose of breaking up these accumulations. In many cases, however, such a shock will not suffice for liberating the long strands contained in the debris to allow them to slip off the teeth.

It is an important feature of the present invention that the shank of the harrow tooth is constructed with the intermediate portion 13 which is inclined at an angle such, and has a length such, that it will form a travel path on which the material that has proceeded to this portion of the shank will be caused to slide up and down under the influence of new material pushing up from below. Since this new material will always be supplied at a constantly varying rate owing to the irregularities of the soil being treated the upward push exerted thereby on the material present on the travel path 13 will likewise vary and this is the reason why the latter material will slide up and down and will thereby be effectively loosened so that roots, stubble, weeds and other strands will be liberated and permitted to slip off the teeth. The inclination and minimum length of the travel path 13 should be very carefully chosen for this purpose, taking into account the nature of the soil being treated. If the travel path is too steep the accumulations will be tipped off before they have had an opportunity of being broken up, and if it is too flat, the accumulations will come to rest in the rearward loop of the tooth. This can easily be ascertained from the fact that the portion 13 will not become worn as it will when it is inclined at the correct angle. It has been found that in many cases an inclination of about 45° will be satisfactory, but this value is of course only to be considered an example from which deviations in one direction or the other may be necessary or desirable. In practice, it will be relatively easy to determine the optimum value of the inclination by some simple tests for best results.

The part of the harrow tooth that is most likely to become worn is of course the tip, and is therefore preferable, as described, to construct the tip as a detachable part, as is well known in the art. Moreover, according to the invention, the tip is constructed as a forwardly curved flat member of a thickness descreasing gradually from the zone of attachment of the tip towards its front end, the curvature and tapering of the tip being so chosen that the shape of the front portion of the tip will be substantially unchanged though the tip may be worn down to a considerable extent. In Fig. 4 it is indicated by dotted lines how wear attacks the tip. As will be seen the front edge is attacked at a considerably higher rate than the flat front surface, and owing to the curvature and tapering configuration of the tip the geometrical shape will remain substantially unchanged until the tip has been worn down practically to its root where it is attached to the shank. The longitudinal contour of the tip may be defined by two circular arcs having their centers displaced relative to one another, and great care should be taken in determining the curvature and taper of the tip to obtain best results.

As regards the spring attachment of the harrow tooth, it will be noted that, in the example shown, practically the whole resiliency of the harrow tooth is concentrated in this attachment. This arrangement is preferred to constructions where the shank in itself is formed by a spring strap, though the latter construction may also be used in practising the invention, if desired. However, the spring attachment has the advantage that the resiliency may be more readily controlled and varied when it is found desirable. In the particular form of the spring attachment contemplated according to the invention the shank is clamped between two spring straps of the spring attachment, as described. This arrangement permits of a very rigid and stable attachment with no possibility of play in the connection or of undesired and uncontrolled vibration. Besides, this arrangement offers a very simple means of varying the spring action, viz., by removing one of the spring straps 16 and 17.

I claim:

1. In a harrow, a harrow tooth of a cross section broadened transversely to the direction of movement of the harrow, and comprising a soil engaging lower portion extending at an acute, forwardly and downwardly inclined angle in the vertical plane of movement of the harrow, said lower portion being constructed to dig up earth, stubble, roots, weeds and other debris from the soil, an intermediate portion bent rearwardly through a rounded bend relative to said lower portion and extending at less inclination than the latter and having a length such as to form a travel path on which earth, stubble, weeds, roots and other debris liberated from the soil will be caused to slide up and down by the action of new material pushing up from below at varying speed, and an upper portion constructed for attachment to the frame of a harrow.

2. In a harrow, a harrow tooth of a cross section broadened transversely to the direction of movement of the harrow, and comprising a shank having a lower shank portion extending at a steep forward and downward inclination in the vertical plane in which the harrow moves over the soil, said lower shank portion and having a tip detachably mounted at the lower end thereof, an intermediate shank portion bent in said vertical plane rearwardly at a point well above the soil surface through a rounded bend relative to said lower shank portion and extending at less inclination than the latter said less inclined portion being substantially rectilinear and having a length such as to form a travel path on which earth, stubble, roots, weeds and other debris liberated from the soil will be caused to slide up and down by the action of new material pushing up from below at varying speed, and an upper shank portion connecting with said intermediate shank portion through a large forward bend; and a spring attachment rigidly secured to said upper shank portion and constructed for attachment to the frame of a harrow.

3. A harrow tooth comprising a shank carrying a soil engaging tip at its lower end and shaped as described in claim 1 to break up accumulations of earth, stubble, roots, weeds and other debris pushing up from said tip, the shank being constructed at its upper end with a freely extending substantially rectilinear shank portion, and a spring attachment constructed for attachment to the frame of a harrow and comprising two spiral spring straps, the said upper portion of the shank being clamped between the free ends of said spring straps.

4. In a harrow, a harrow tooth curved in the vertical plane of movement of the harrow over the soil, comprising a soil-engaging lower portion constructed to dig up earth, stubble, roots, weeds and other debris from the soil, said soil-engaging lower portion being inclined at an angle of approximately 20° relative to a direction perpendicular to the surface of the soil in said plane of harrow movement, an intermediate portion bent rearwardly through a rounded bend relative to said lower portion and extending at an inclination of approximately 45° with regard to the aforesaid perpendicular direction and of such length as to form a travel path on which earth, stubble, weeds, roots and other debris liberated from the soil will be caused to slide up and down by the action of new material pushing up from below at varying speed, and an upper portion constructed for attachment to the frame of a harrow.

References Cited in the file of this patent

UNITED STATES PATENTS

| 241,697 | Nellis | May 17, 1881 |
| 247,658 | King | Sept. 27, 1881 |
| 316,886 | Everingham | Apr. 28, 1885 |
| 343,263 | Wilson | June 8, 1886 |
| 839,310 | Nelson | Dec. 25, 1906 |
| 1,327,119 | Stalter | Jan. 6, 1920 |

FOREIGN PATENTS

| 451,611 | France | Feb. 17, 1913 |
| 94,800 | Austria | Nov. 10, 1923 |
| 42,761 | Denmark | Aug. 5, 1930 |
| 43,331 | Denmark | Oct. 28, 1930 |
| 516,114 | Germany | Jan. 19, 1931 |